(12) United States Patent
Stone et al.

(10) Patent No.: US 10,710,318 B2
(45) Date of Patent: Jul. 14, 2020

(54) HIGH SPEED COMPOSITE LAYUP VIA MULTIPLE MACHINES

(71) Applicant: The Boeing Company, Chicago, IL (US)

(72) Inventors: Paul R. Stone, Federal Way, WA (US); William Ralph Taylor, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 483 days.

(21) Appl. No.: 15/606,498

(22) Filed: May 26, 2017

(65) Prior Publication Data
US 2018/0339469 A1 Nov. 29, 2018

(51) Int. Cl.
| B32B 41/00 | (2006.01) |
| B29C 70/38 | (2006.01) |
| B29C 70/54 | (2006.01) |
| B29C 70/50 | (2006.01) |
| B29C 70/20 | (2006.01) |
| B32B 38/18 | (2006.01) |

(Continued)

(52) U.S. Cl.
CPC .......... B29C 70/388 (2013.01); B29C 70/202 (2013.01); B29C 70/38 (2013.01); B29C 70/50 (2013.01); B29C 70/545 (2013.01); B32B 38/185 (2013.01); B32B 38/1808 (2013.01); B29C 2793/0072 (2013.01); B29C 2793/0081 (2013.01); B29K 2105/0872 (2013.01); B29K 2307/04 (2013.01)

(58) Field of Classification Search
CPC ....... B29C 70/388; B29C 70/38; B29C 70/50; B29C 70/202; B29C 70/545; B29C 2793/0081; B29C 2793/0072; B32B 38/1808; B32B 38/185; B32B 38/0004; B32B 38/1816; B29K 2105/0872; B29K 2307/04
USPC ........................... 156/64, 350, 351, 378, 379
See application file for complete search history.

(56) References Cited

U.S. PATENT DOCUMENTS

| 2002/0059976 | A1* | 5/2002 | Taggart | .................. B29C 70/48 156/177 |
| 2010/0230202 | A1* | 9/2010 | Anderson | ............. B29C 70/386 181/207 |
| 2016/0325509 | A1* | 11/2016 | Prebil | ................... B29C 70/545 |

FOREIGN PATENT DOCUMENTS

| FR | 2761280 A1 | 10/1998 |
| WO | 2015152331 A1 | 10/2015 |

OTHER PUBLICATIONS

Pick-and-Place Equipment; Automated Designs, Inc.; Web Design; Asheville, NC.

(Continued)

*Primary Examiner* — Michael N Orlando
*Assistant Examiner* — Joshel Rivera
(74) *Attorney, Agent, or Firm* — Duft & Bornsen, PC

(57) ABSTRACT

Systems and methods are provided for laying up laminates. One embodiment is a method that includes laying up a multi-layer laminate of fiber reinforced material onto a surface, by: feeding a tape of fiber reinforced material to tape cutters which cut the tape into pieces, picking up pieces of the fiber reinforced material via pick-and-place devices at each of multiple lamination units that are in sequence in a direction of travel, and placing the pieces of fiber reinforced material via the pick-and-place devices to form a laminate as the surface and the lamination units change position with respect to each other and multiple pieces are laid-up concurrently.

40 Claims, 13 Drawing Sheets

(51) Int. Cl.
 *B29K 105/08* (2006.01)
 *B29K 307/04* (2006.01)

(56) References Cited

OTHER PUBLICATIONS

Products; Imaginative Advertising; Copyright 2017 Mikrosam.
Bearden et al, "An Automated Grid-Based Robotic Alignment System for Pick and Place Applications" (Abstract), Journal of Intelligent & Robotic Systems, Dec. 2016, vol. 84, Issue 1, pp. 815-828.
European Search Report; Application EP18174263; dated Oct. 5, 2018.

* cited by examiner

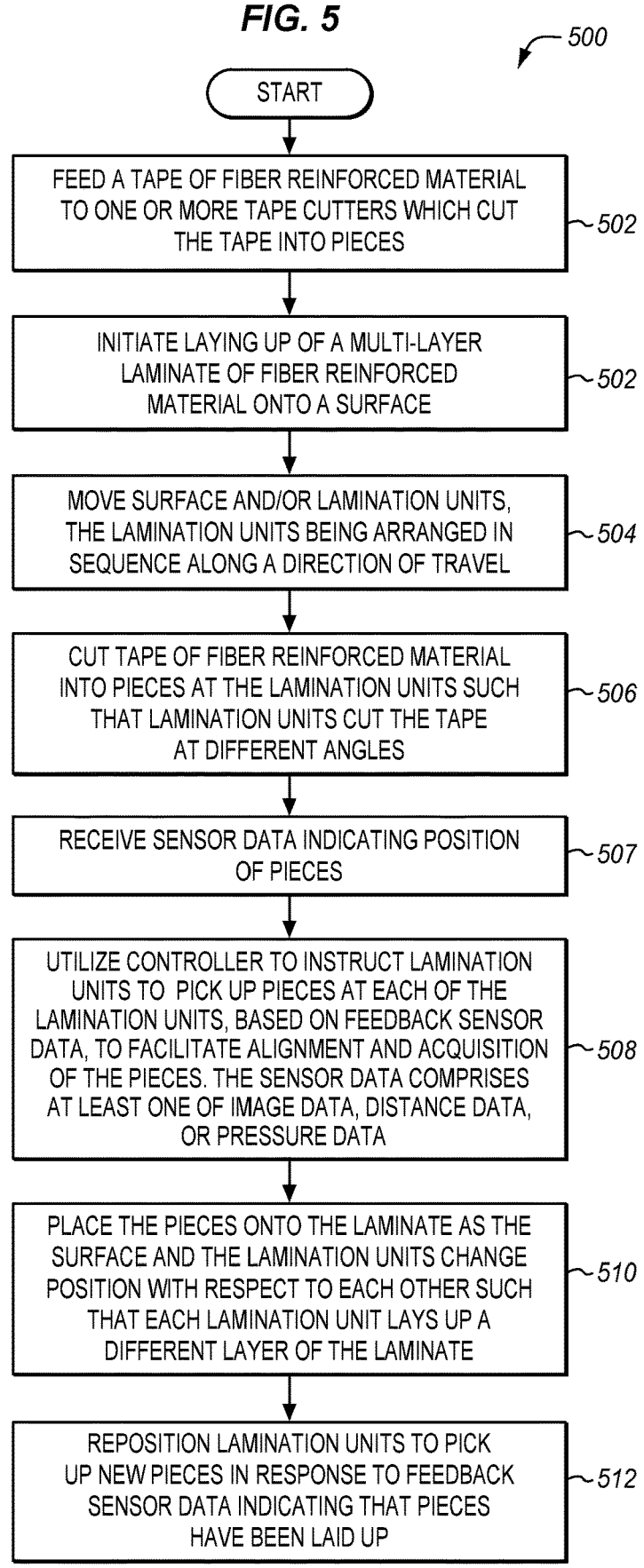

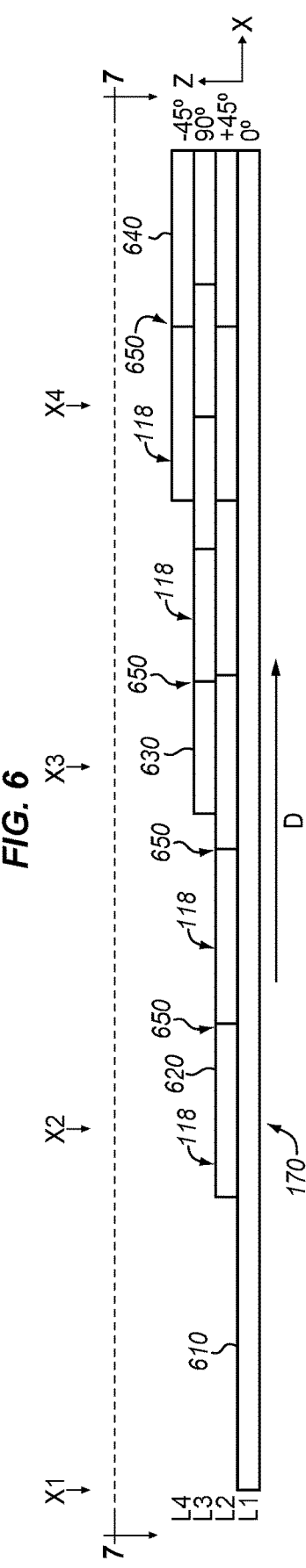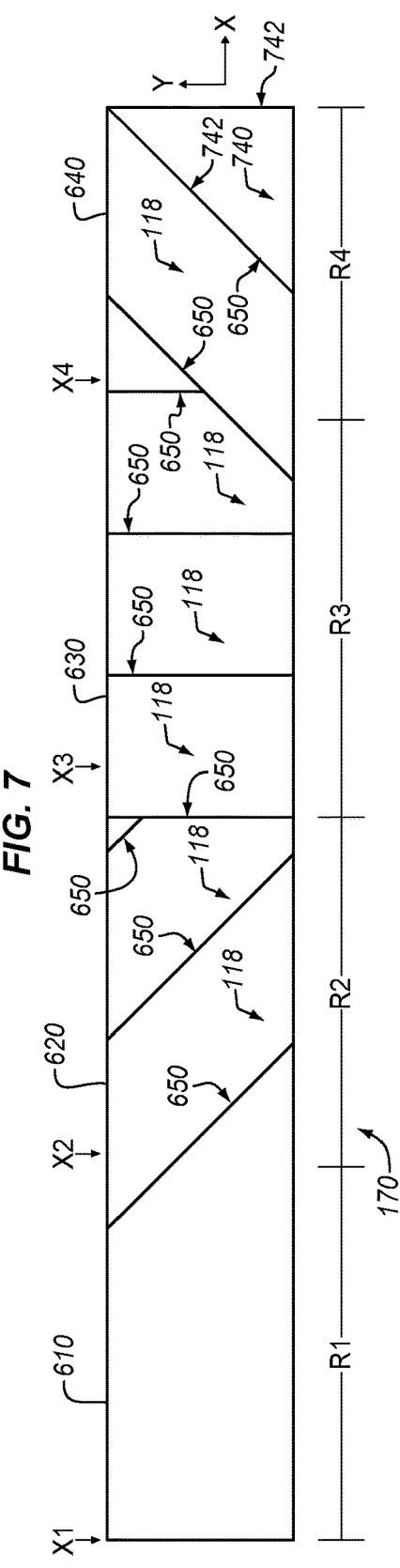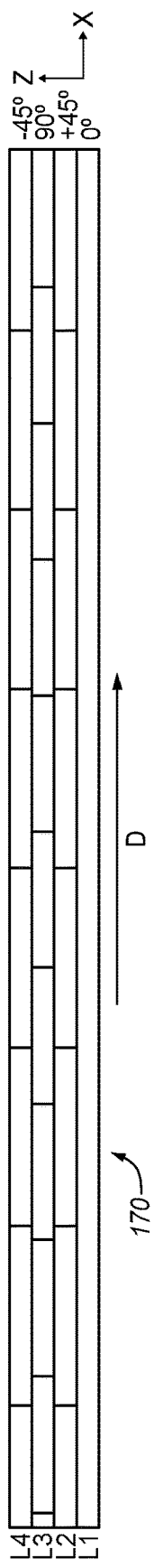

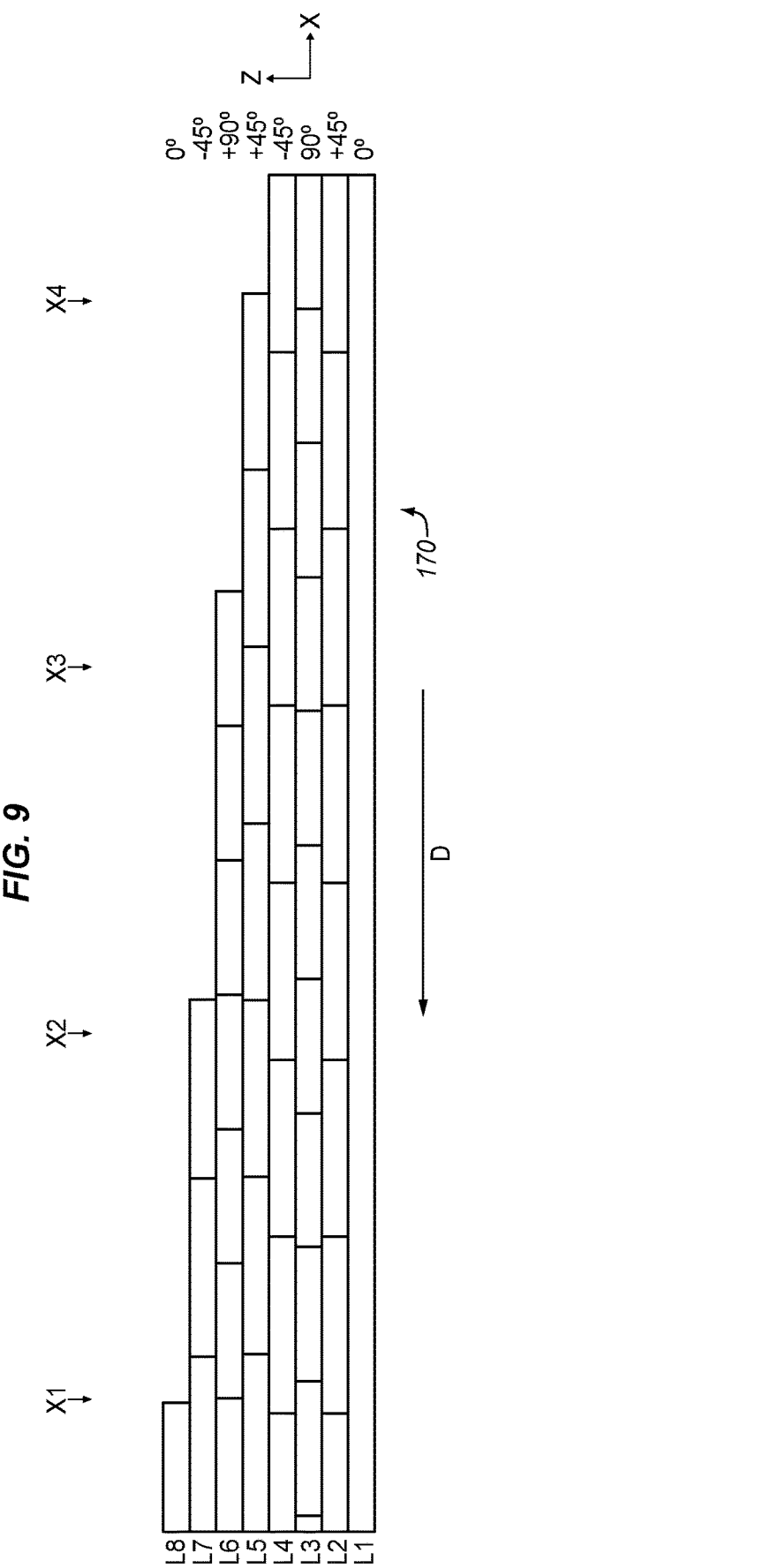

HIGH SPEED COMPOSITE LAYUP VIA MULTIPLE MACHINES

FIELD

The disclosure relates to the field of composite manufacturing, and in particular, to systems that automatically lay-up multiple layers of constituent material for curing into composite parts.

BACKGROUND

Multi-layer laminates of material (e.g., uncured Carbon Fiber Reinforced Polymer (CFRP)) may be formed into any of a variety of shapes for curing into a composite part, such as a stringer, floor beam, or other component. To facilitate the fabrication of composite parts, a robot such as a Flat Tape Laying Machine (FTLM) may be utilized. For example, an FTLM may lay up one or more layers of material that form a flat laminate which is then cut, laid-up with other material, and cured into a composite part.

The operations of an FTLM may be directed by a Numerical Control (NC) program that dictates movements of a head of the FTLM over the laminate as layup continues. Laying up flat laminates remains a time consuming process, as the FTLM head may have to reposition itself each time a new course of material will be laid up for a layer. Hence, many passes of an FTLM may be needed in order to fully lay up even a single flat layer. Furthermore, the head of an FTLM may be reoriented after each layer to align with a new fiber orientation, again increasing layup time.

Presently, FTLM techniques are not capable of engaging in high enough throughput to enable just-in-time layup procedures for flat laminates. Because FTLM techniques utilize a substantial amount of time to lay up flat laminates, laminates may be created in batches which are stored, frozen, and then thawed out for use. The associated storage and freezing machinery used for such laminates is both large and expensive. Hence, technicians continue to desire systems and methods that enhance fabrication speed in order to reduce the costs of fabrication.

SUMMARY

Embodiments described herein utilize lamination units which are arranged in sequence. Each lamination unit may cut, pick, and place pieces of material onto a flat laminate in order to lay up a layer to form a laminate. In this manner, multiple layers may be laid-up at once for a single laminate, which substantially enhances the speed of fabrication. The laminate moves relative to the robots to facilitate overall speed and eliminate any need to reposition components individually.

One embodiment is a method that includes laying up a multi-layer laminate of fiber reinforced material onto a surface, by: feeding a tape of fiber reinforced material to tape cutters which cut the tape into pieces, picking up pieces of the fiber reinforced material via pick-and-place devices at each of multiple lamination units that are in sequence in a direction of travel, and placing the pieces of fiber reinforced material via the pick-and-place devices to form a laminate as the surface and the lamination units change position with respect to each other and multiple pieces are laid-up concurrently.

A further embodiment is a non-transitory computer readable medium embodying programmed instructions which, when executed by a processor, are operable for performing a method. The method includes laying up a multi-layer laminate of fiber reinforced material onto a surface, by: feeding a tape of fiber reinforced material to tape cutters which cut the tape into pieces, picking up pieces of the fiber reinforced material via pick-and-place devices at each of multiple lamination units that are in sequence in a direction of travel, and placing the pieces of fiber reinforced material via the pick-and-place devices to form a laminate as the surface and the lamination units change position with respect to each other and multiple pieces are laid-up concurrently.

A further embodiment is an apparatus. The apparatus includes a plurality of pick and place devices, a controller, sensors coupled to the controller, a composite material supply device that supplies pieces of fiber reinforced material for the pick and place device, and a movement device that alters a position of a surface being laid up, relative to the pick and place devices. The controller controls operation of the pick and place devices based on input from the sensors.

A further embodiment is a system that includes a surface, and lamination units that move relative to the surface in a direction of travel, that are arranged in sequence along the direction of travel, and that each lay up pieces of a multi-layer laminate of fiber reinforced material onto the surface. Each lamination unit includes an infeed roller that supplies a tape of the material, a drive roller that draws tape from the infeed roller, a ply cutter that cuts pieces from the tape at an angle and is rotatable to change the angle during operation and a pick-and-place device that lays up a layer of the laminate by picking up the pieces and placing the pieces onto the laminate.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 5 is a flowchart illustrating a method for operating a lamination system in an exemplary embodiment.

FIGS. 6-9 illustrate build-up of a laminate by a lamination system in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
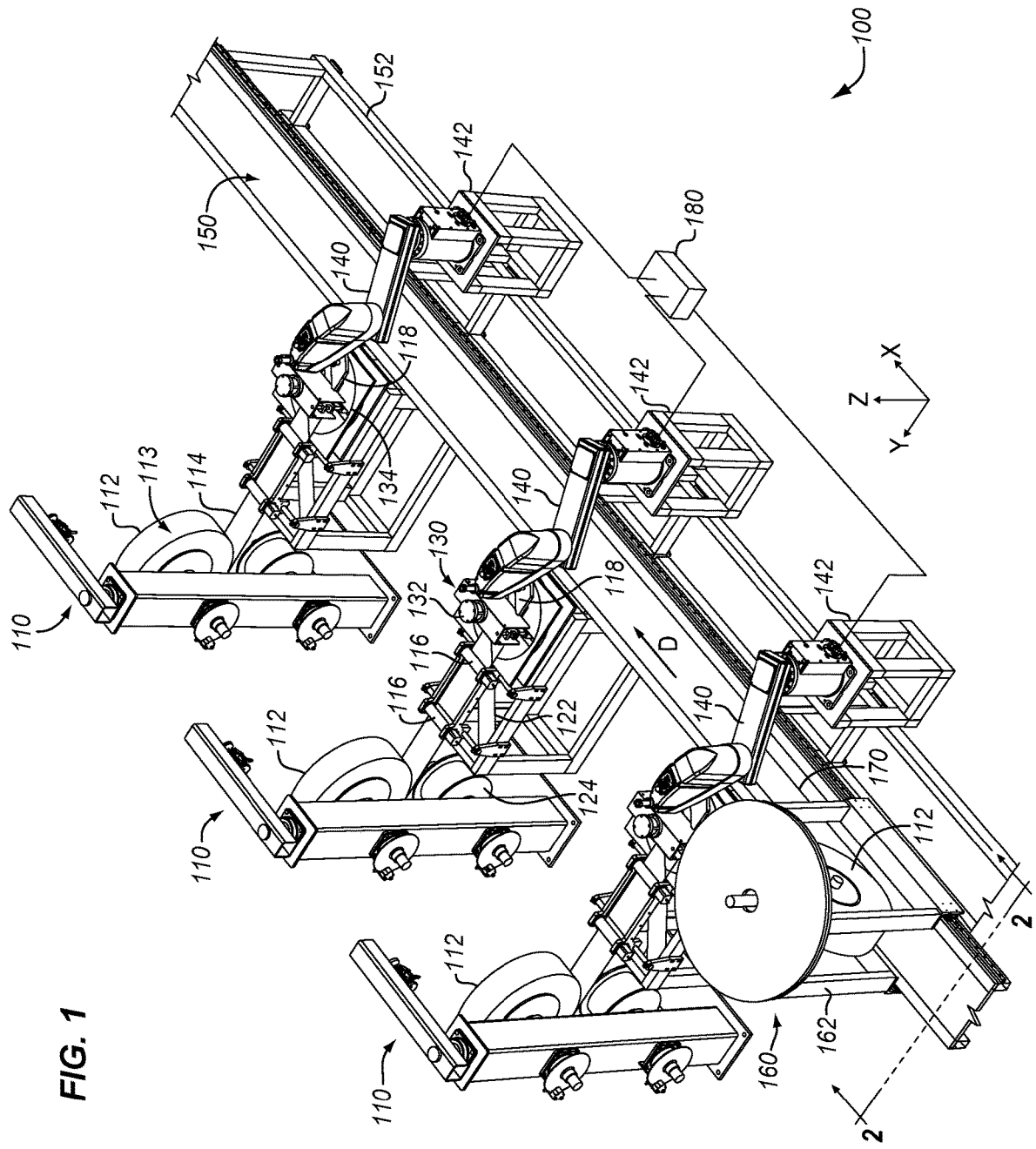
FIG. 1 is a perspective view of a lamination system in an exemplary embodiment.

FIG. 1 is a perspective view of a lamination system 100 in an exemplary embodiment. Lamination system 100 lays up a multi-layer laminate 170 of fiber-reinforced material 113 that will be cured into a composite part. The fiber-reinforced material 113 may comprise uncured Carbon Fiber Reinforced Polymer (CFRP) that has been pre-impregnated with a curable resin, may comprise dry carbon fiber, may comprise dry carbon fiber tacked together via a thermoplastic veil, may comprise fiberglass fiber laminate, etc. As laminate 170 advances in a direction of travel D, laminate 170 passes by lamination units 110. Lamination units 110 are arranged in sequence along direction of travel D. Each lamination unit 110 cuts and places pieces of material 113 (e.g., a carbon fiber tape of any suitable width, even tape that is wider than utilized for an FTLM) onto laminate 170 in order to lay up laminate 170. For example, in one embodiment each lamination unit 110 lays up a single layer of laminate 170, and the fibers of each layer are oriented parallel to each other.

Frame 152 of lamination system 100 provides support for surface 150 (e.g., a surface of a mandrel). In this embodiment, surface 150 is the upper surface of a belt of a conveyor that conveys laminate 170 along direction D. In further embodiments, surface 150 may comprise a surface of a shuttle table, or a surface of a stationary table that lamination units 110 move relative to. In most embodiments, the movement is linear. However, further embodiments may involve arcing or even circular movement. Layup may initiate with in-line laminator 160, which is held by support 162 and utilizes infeed roller (tape dispenser) 112 to feed material 113 onto laminate 170. Material 113 supplied by in-line laminator 160 has a fiber orientation which is parallel to direction D. As laminate 170 continues along direction D, lamination units 110 are reached. Each lamination unit 110 includes an infeed roller (composite material supply device) 112 that stores and supplies tape 114. Tape 114 is drawn from an infeed roller 112 via drive rollers 116, which are spun in order to apply force to tape 114 that drives tape 114 forward. During this process, a disposable backing 122 is separated from tape 114 and stored on take-up reel 124.

Each ply cutter 130 cuts pieces 118 from tape 114, which are laid-up onto laminate 170 by a corresponding pick-and-place device 140. In this embodiment, ply cutter 130 comprises blade 132 and rotary table 134. Pick-and-place devices 140 are held in place by supports 142, and may comprise devices that utilize gripping components or components that apply a differential vacuum to a piece 118 in order to hold a piece 118 during movement.

Controller 180 is also depicted in FIG. 1. Controller 180 manages the operations of lamination units 110, in-line laminator 160, and/or surface 150 in order to control layup for laminate 170. For example, controller 180 may execute one or more Numerical Control (NC) programs to manage the operations of pick-and-place devices 140, ply cutters 130, etc. Controller 180 may be implemented, for example, as custom circuitry, as a hardware processor executing programmed instructions, or some combination thereof.

Lamination system 100 is unlike systems which rely on an FTLM to slowly lay up a laminate by constantly re-orienting and repositioning a mobile head. Specifically, lamination system 100 enhances overall layup speed by eliminating the need for an FTLM entirely while also enabling multiple layers (e.g., one for each lamination unit 110) to be laid-up simultaneously at laminate 170. Furthermore, the use of pick and place devices, 140 instead of a complex FTLM, allows for less complicated (and less expensive) machinery to be utilized during fabrication. Furthermore, pick and place devices 140 may avoid the need for maneuvering FTLM through rotations, translations and twists, and hence may avoid associated dynamics/kinematics issues.

Figure 2:
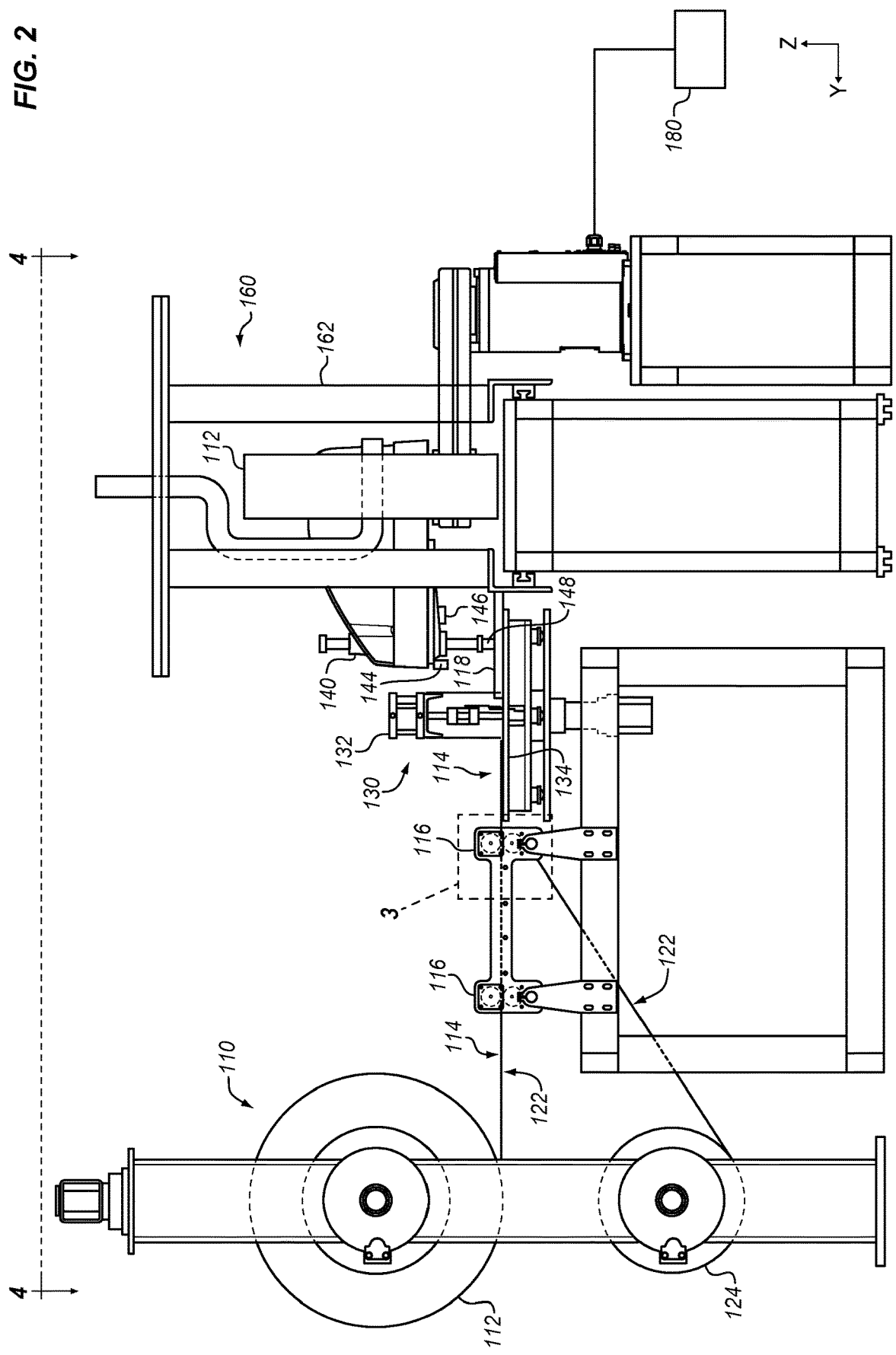
FIG. 2 is a side view of a lamination system in an exemplary embodiment.

Further details of lamination system 100 are provided in FIG. 2, which is a side view illustrated by view arrows 2 of FIG. 1. FIG. 2 depicts components illustrated in FIG. 1, and further depicts a sensor 144 (e.g., a camera that acquires images of a projected laser grid). Sensor 144 may be utilized by pick-and-place device 140 ensure that pieces 118 of material 113 are laid-up onto laminate 170 without forming gaps at laminate 170. For example, sensor 144 may detect the presence of a piece 118 on an end effector 148 and may further detect position of the piece 118 relative to the end effector 148. That is, each pick-and-place device 140 may arrange pieces 118 onto laminate 170 into a different contiguous layer. For example, if a ply cutter 130 cuts pieces 118 at a forty five degree angle, a corresponding pick-and-place device 140 may rotate pieces 118 forty five degrees, and place pieces 118 contiguously with each other at laminate 170 to form a single layer without gaps having a forty five degree fiber orientation. In this manner, the fiber orientation of each layer corresponds with the angle of a ply cutter 130 that is cutting pieces 118 for that layer.

In this embodiment, a heater 146 (e.g., a radiant heater) at pick-and-place device 140 heats pieces 118 to a tacking temperature (e.g., 190° F.) before laying up pieces 118. FIG. 2 further depicts region 3 in which backing 122 is separated from tape 114 after exiting infeed roller 112, and one or more sensors 144 (e.g., a pressure sensor, camera, laser or ultrasonic distancing device, etc.) placed along lamination system 100. Sensors 144 may be utilized to sense locations of pieces 118 prior to or during cutting by ply cutters 130. Sensors 144 may further provide sensor data that may be utilized to sense pieces 118 during movement of an end effector 148 of a pick and place device 140 to acquire pieces 118, may be utilized to sense a presence of a piece 118 on an end effector 148, and may be utilized to sense the location of an end effector 148 relative to a pick up or drop off location. Sensor input may further be utilized to sense the position/orientation of end effector 148 relative to the pick up or drop off location, to determine a pressure used to apply a piece 118 to laminate 170, to sense that a piece 118 has been placed at laminate 170, and/or even to sense a temperature of piece 118. Further details of sensors 144 are provided with respect to FIG. 5 below.

In further embodiments, end effector 148 includes multiple sensors 144. As used herein, "a number of" sensors include one or more sensors. Sensors 144 therefore include any desirable quantity of sensors. Sensors 144 generate any desirable type of measurements as sensor data. Although sensors 144 depicted as proximate to end effector 148, in some embodiments sensors 144 may be at least one of connected to pick and place device 140, connected to end effector 148, or otherwise positioned within system 100. For example, sensors 144 may be placed throughout system 100 to track the movement of end effector 148. In a further embodiment, sensors 144 may be placed at system 100 to generate sensor data (e.g., location data) for laminate 170. In still further embodiments, sensors 144 may be connected to pick and place device 140 instead of end effector 148. In some still further embodiments, number of sensors 144 may be connected to end effector 148 in addition to pick and place device 140.

Figure 3:
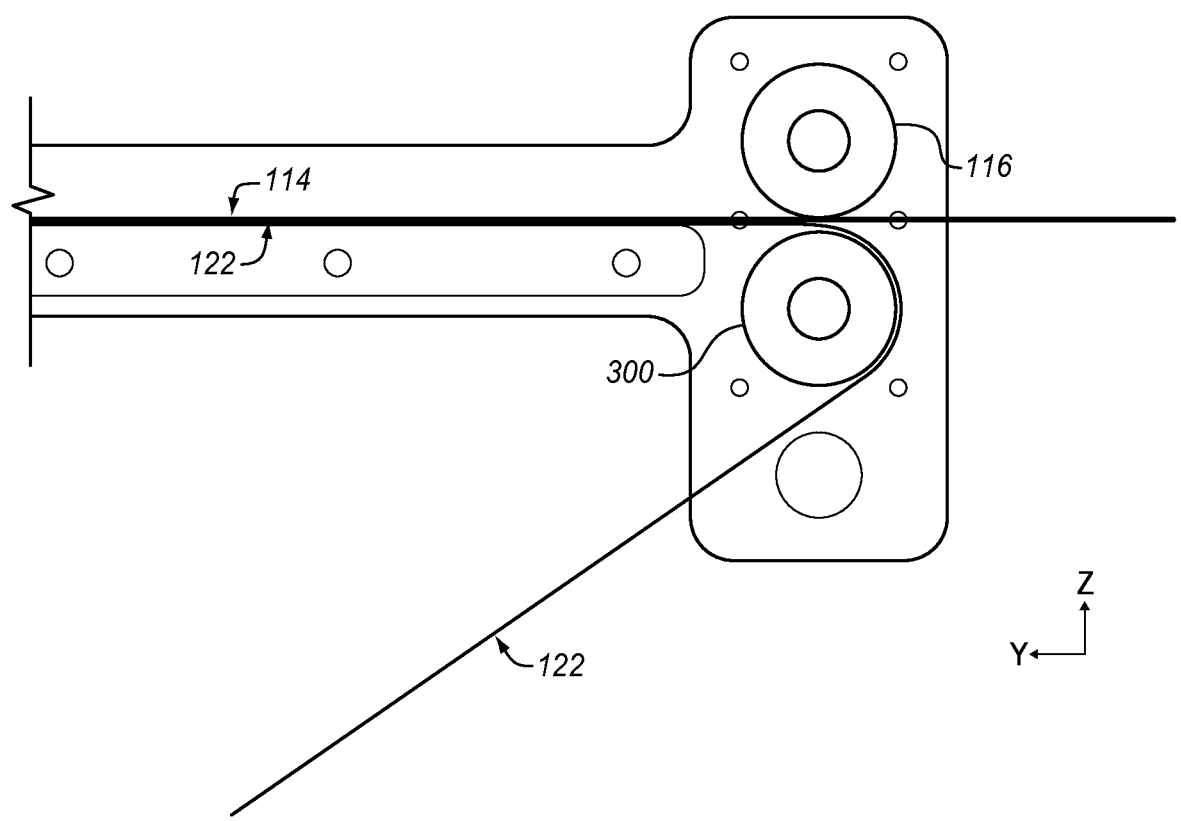
FIG. 3 is a zoomed-in view of a portion of a lamination system that removes a backing from a tape in an exemplary embodiment.

FIG. 3 is a zoomed in view of region 3 of FIG. 2, and illustrates a take-up roller 300 which complements drive roller 116. Backing 122 winds about take-up roller 300 as backing 122 continues towards take-up reel 124. Meanwhile, tape 114 proceeds towards ply cutter 130, which may operate as a tape cutter to cut tape 114. In such embodiments, any suitable combination of drive roller 116 and/or take-up roller 300 may be actively powered, and any combination of rollers may be operated as drive and/or slave rollers.

Figure 4:
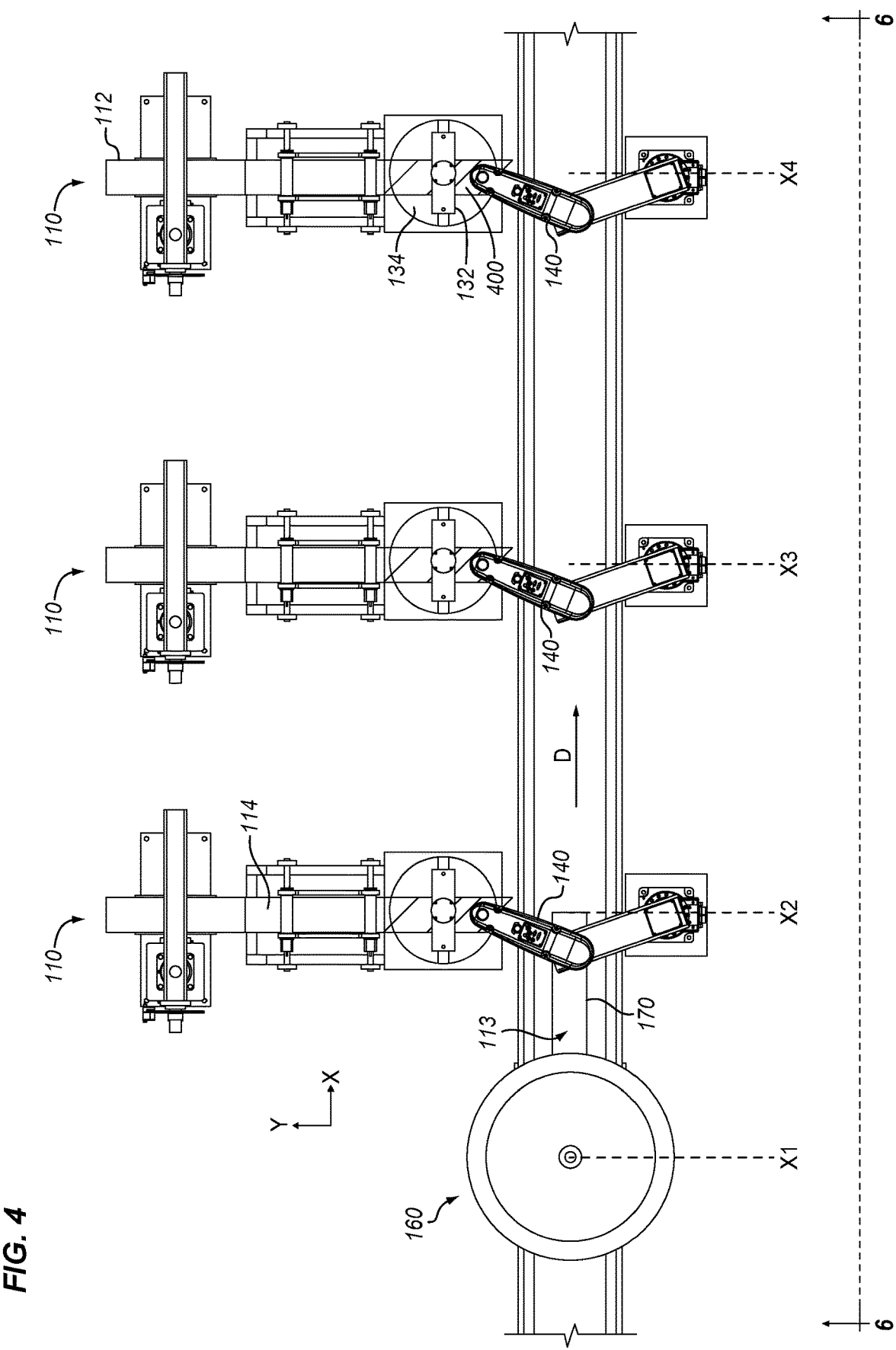
FIG. 4 is a top view of a lamination system in an exemplary embodiment.

FIG. 4 provides a further illustration of lamination system 100 in the form of a top view indicated by view arrows 4 of FIG. 2. FIG. 4 illustrates that in-line laminator 160 and lamination units 110 each occupy a different position along D (e.g., along the X axis). These positions are labeled as X1, X2, X3, and X4. As laminate 170 advances in direction D, in-line laminator 160 applies a first layer of material 113, a lamination unit 110 at X2 applies a second layer of material 113, a lamination unit 110 at X3 applies a third layer of material 113, and a lamination unit 110 at X2 applies a fourth layer of material 113. For example, piece 400 is laid up in a fourth layer of material 113 at laminate 170. Thus, laminate 170 increases in thickness as it traverses along D. Illustrations of this layup process are provided with respect to FIGS. 6-9, which are described below. In some embodiments, a much wider tape than typical may be used at by in-line laminator 160 at position X1. Wider tapes than typical for an FTLM can also be used at positions X2, X3 and X4 as these stations do not have to move.

Illustrative details of the operation of lamination system 100 will be discussed with regard to FIG. 5. Assume, for this embodiment, that an operator has loaded infeed roller 112 with tape 114, and that controller 180 has activated lamination units 110, and in-line laminator 160.

FIG. 5 is a flowchart illustrating a method 500 for operating a lamination system in an exemplary embodiment. The steps of method 500 are described with reference to lamination system 100 of FIG. 1, but those skilled in the art will appreciate that method 500 may be performed in other systems. The steps of the flowcharts described herein are not all inclusive and may include other steps not shown. The steps described herein may also be performed in an alternative order.

Drive rollers 116 feed tape 114 of fiber reinforced material 113 to one or more tape/ply cutters 130 which will cut tape 114 into pieces (step 501). Controller 180 initiates laying-up of multiple layers of fiber reinforced material 113 for laminate 170, by directing placement of material 113 onto surface 150 (step 502). This process includes moving surface 150 and/or lamination units 110 with respect to each other (step 504). For example, this may comprise controller 180 directing surface 150 to advance in direction D by conveyor while the lamination units are stationary, moving the lamination units while surface 150 remains stationary, etc., depending on the embodiment. In further embodiments depicted in FIGS. 11-13, the mechanism by which motion of surface 150 relative to lamination units 110 is achieved may vary. In one embodiment, in-line laminator 160 lays up a layer which has a fiber orientation parallel to direction D. In this case, a ply cutter (not shown) at in-line laminator 160 may cut the entire/full layer as a single piece 118 of tape 114.

As surface 150 and/or lamination units 110 advance, tape 114 is drawn from infeed rollers 112 by action of drive rollers 116, and ply cutters 130 cut tape 114 into pieces 118 at lamination units 110 (step 506). The amount of tape drawn over time may be regulated by controller 180 based on a tension sensor (not shown) at infeed roller 112. The angle of each ply cutter 130 is adjustable, and controller 180 controls lamination units 110 such that various lamination units 110 may cut tape 114 at different angles with respect to each other. Such a technique may cause each layer of laminate 170 to exhibit a different fiber orientation, which desirably enhances strength across multiple dimensions.

One or more sensors (not shown) may quantify an amount of rotation at a ply cutter 130, and/or whether successful cuts have been made by a ply cutter 130. For example, a rotary sensor may generate a signal each time that ply cutter 130 rotates a preset amount, and this information may be interpreted by controller 180 to determine a present rotation of ply cutter 130. In further embodiments, ply cutter 130 may have other configurations, but a sensor may still be used to control operation of ply cutter 130.

These techniques may further utilize one or more sensors 144. For example, one or more sensors 144 (e.g., cameras) may provide images which are utilized by controller 180 to determine an orientation and/or distance of a pick and place device 140 with respect to a piece 118 before (and/or an orientation of piece 118), during, or after transportation of a piece 118. In a further example, one or more sensors 144 (e.g., a laser or ultrasonic distancing sensor) acquires distance information to determine a distance (e.g., a vertical distance) of an end effector 148 of a pick and place device 140 to a piece 118 during pick up of the piece 118.

Upon contact of an end effector 148 with a piece 118, one or more sensors 144 (e.g., pressure sensors) may acquire pressure information/data indicating a contact pressure between the pick and place device 140 and the piece 118 during operation of pick and place device 140 (e.g., during transport of piece 118 to a desired location). For example, controller 180 may utilize pressure data from sensor 144 to regulate end effector contact force with a piece 118, to regulate a pressure applied to piece 118 during compaction of piece 118 onto laminate 170, and/or to confirm release of a piece 118 by end effector 148.

Controller 180 may utilize the various types of information described above to engage in feedback-based control of end effector 148, and/or other components of a pick and place device 140. For example, controller 180 may utilize image and/or distancing input from one or more sensors 144 to sense the location, orientation, and shape of a piece 118 while manipulating/controlling an end effector 148. Controller 180 may further utilize pressure data from a sensor 144 to detect the presence (e.g., securement) of piece 118 at end effector 148, and/or the location and/or rotation of piece 118 at end effector 148. Input from one or more sensors 144, including pressure, distance, and/or image data may further be utilized by controller 180 to join piece 118 to the end effector, and locate piece 118 relative to a mandrel (e.g., placement location). For example, controller 180 may achieve this result by sensing the mandrel based on image and/or distance data and controlling end effector 148 touching the mandrel with the piece 118. One or more sensors 144 may even provide image or distance input indicating the exact location at which piece 118 is placed onto laminate 170 to facilitate feedback control by controller 180. Based on the amount of reported compaction force by one or more sensors 144, controller 180 may precisely apply an amount of compaction of a piece 118 against laminate 170. Controller 180 may further implement feedback based control of pick and place device 140 based on input from sensor 144 while controlling the end effector.

Although not depicted in FIG. 5, any desirable quantity or type of sensors 144 may be connected to end effector 148 or pick and place device 140 for process control. For example, at least one of end effector 148 or pick and place device 140 may be controlled based on a number of sensors (not depicted) connected to at least one of end effector 148 or pick and place device 140. Measurements from a number of sensors (not depicted) may be used to determine when to pick and place device 140, when to pull vacuum on end effector 148, when to apply pressure to end effector 148, when end effector 148 is holding a composite material (not depicted), or when a piece 118 of composite material has been removed from end effector 148 and compacted onto a layup structure (not depicted).

In some illustrative examples, distance data acquired by one or more sensors 144 indicates the distance of end effector 148 from at least one of a piece 118 of composite material or laminate 170 to receive the piece 118. Thus, method 500 involves receiving sensor data indicating positions of pieces 118 (step 507). In one example, a number of sensors 144 generates distance data of end effector 148 from the composite material as the end effector 148 is lowered towards piece 118 to pick up piece 118. In another example, the number of sensors 144 generates distance data of end effector 148 from the piece 118 as piece 118 is placed onto a layup structure. In one example, the number of sensors 144 generates distance data of end effector 148 from piece 118 as end effector 148 moves away from the piece 118 and/or laminate 170.

In some illustrative examples, the number of sensors 144 may detect the presence of a piece 118 when piece 118 is held on end effector 148. In some illustrative examples, the number of sensors 144 may detect the amount of pressure applied to piece 118 as pressure data. In some illustrative examples, the end effector 148 is moved away from piece 118 compacted onto laminate 170 (or another surface) when at least one of pressure data or distance data indicates that piece 118 is no longer held on end effector 148.

Controller 180 is utilized to instruct lamination units 110 (specifically, pick-and-place devices 140) to pick up pieces 118 at each of lamination units 110 (step 508). This is performed based on feedback sensor data from sensors 144, to facilitate alignment and acquisition of pieces 118. Furthermore, the sensor data utilized for feedback comprises at least one of image data, distance data, or pressure data. Pick and place devices 140 place pieces 118 onto laminate 170 as surface 150 and lamination units 110 change position with respect to each other (step 510). For example, controller 180 may control contact of end effector 148 with pieces 118, based on input from sensor 144. In one embodiment, controller 180 receives input from sensor 144 sensing the location and shape of a piece 118, and controls end effector 148 based on that input. Controller 180 further directs end effector 148 to join with the piece 118, and locates the piece 118 to a surface such as a mandrel. The presence of the surface (e.g., a surface of a mandrel) may be detected via sensor 144, and controller 180 may control end effector 148 during placement of the piece 118 onto the surface. In a further embodiment, sensor 144 provides input sensing the location on laminate 170 when placing and/or compacting piece 118 against the surface and/or laminate 170. Controller 180 may engage in any suitable form of feedback control based on sensed information from sensor 144 to control end effector 148 in picking up, moving, and/or placing piece 118.

In response to feedback sensor data indicating that pieces 118 have been laid up (e.g., pressure data indicating successful compaction and release of pieces 118), lamination units 110 are further repositioned (e.g., by repositioning pick and place devices 140) in order to prepare to pick up new pieces 118. In this manner, controller 180 may iteratively build up laminate 170 based on sensor data in order to create a multi-layer laminate 170.

The picking and placing of pieces 118 may be performed such that each lamination unit 110 lays up a different layer onto laminate 170. For example, each pick-and-place device 140 may selectively rotate and/or position incoming pieces 118 based on desired fiber orientations of those pieces 118. This may result in each lamination unit 110 laying up a layer onto laminate 170 as laminate 170 passes by each lamination unit 110.

Method 500 provides a substantial benefit over prior systems because it enables rapid layup of multiple layers in order to form a laminate for curing into a composite part. That is, multiple lamination units 110 apply layup to laminate 170 in parallel and/or simultaneously. Thus, multiple layers may be laid-up by a single pass of laminate 170 through lamination units 110, which substantially enhances the speed at which laminate 170 is laid-up. Hence, the systems described herein allow lay up of four plies (or more) of material at the same time, and may even use wider width tapes than prior methods, further increasing fabrication speeds. Any suitable number of pick and place devices, infeed rollers, and/or ply cutters may be utilized per lamination unit, and any suitable number of lamination units may be utilized.

FIGS. 6-9 illustrate build-up of laminate 170 as laminate 170 moves relative to lamination units 110. Specifically, FIG. 6 is a side view of laminate 170 during layup. Lateral positions illustrated in these FIGS. include X1, X2, X4, and X4. Meanwhile, vertical positions illustrated in these FIGS. include L1, L2, L3, etc. As laminate 170 proceeds past X1, a first layer 610 is laid up at L1 by in-line laminator 160. Laminate 170 continues, and as laminate 170 passes X2, a second layer 620 is laid-up at L2 by the lamination unit 110 at X2. Layer 620 formed by multiple cut pieces 118. Boundaries 650 between pieces 118 are also illustrated. Layup continues in a similar fashion as portions of laminate 170 advance past X3 (resulting in layer 630 at L3), and X4 (resulting in layer 640 at L4). As laminate 170 may be substantially long (e.g., tens of feet, such as sixty feet), in-line laminator 160, and lamination units 110 may operate in parallel to continuously lay up their layers at the same time as laminate 170 moves relative to lamination units 110. Each layer may exhibit a different fiber orientation (e.g., 0°, +45°, −45°, 90°, etc.), but layers that have the same fiber orientations may also be laid-up.

FIG. 7 is a top view illustrating laminate 170 as shown in FIG. 6, and corresponds with view arrows 7 of FIG. 6. FIG. 7 illustrates that in this embodiment, the fiber orientations of each layer impact the shape of pieces 118 in each layer. For example, layers 620 and 640 utilize parallelogram-shaped pieces 118, while layer 630 utilizes rectangular pieces 118.

Layer 610 is visible along region R1, layer 620 is visible along region R2, layer 630 is visible along region R3, and layer 640 is visible along region R4. End piece 740 is also illustrated, which terminates a layer that includes a non-orthogonal fiber orientation. End piece 740 may be cut by a ply cutter 130 in the shape of a triangle or trapezoid in order to ensure that its corresponding layer terminates cleanly at a specific coordinate along X. To achieve this result, controller 180 directs the ply cutter 130 to change angle during lay-up of a layer (and specifically, in between cuts for a single piece 118). This forms an end piece having ends 742 that are cut at different angles.

During these operations, sensor data may be acquired from one or more sensors 144 (e.g., a pressure sensor, camera, laser or ultrasonic distancing device, etc.) placed along lamination system 100, in order for controller 180 to engage in feedback-based control of the lamination units. For example, sensors 144 may be utilized to sense locations of pieces 118 prior to or during cutting by ply cutters 130. Sensors 144 may further provide sensor data that may be utilized to sense pieces 118 during movement of an end effector 148 of a pick and place device 140 to acquire pieces 118, may be utilized to sense a presence of a piece 118 on an end effector 148, and may be utilized to sense the location of an end effector 148 relative to a pick up or drop off location. Sensor input may further be utilized to sense the position/orientation of end effector 148 relative to the pick up or drop off location, to determine a pressure used to apply a piece 118 to laminate 170, to sense that a piece 118 has been placed at laminate 170, and/or even to sense a temperature of piece 118.

FIG. 8 illustrates laminate 170 after laminate 170 has completed moving in direction D. In this embodiment, laminate 170 is rectangular in shape, but in further embodiments the length of various layers within laminate 170 may vary in order to form ramps or other features at laminate 170.

With layup completed for the first set of layers, laminate 170 reverses direction D as shown in FIG. 9, resulting in additional layup performed as laminate 170 retreats along X. Controller 180 may adjust the angles of ply cutters 130 before laminate 170 reverses direction, in order to provide a new set of fiber orientations. Lay up then continues for layers at L5 (starting at X4), L6 (starting at X3), L7 (starting at X2), and L8 (starting at X1) as laminate 170 continues along the newly reversed direction D.

Figure 10:
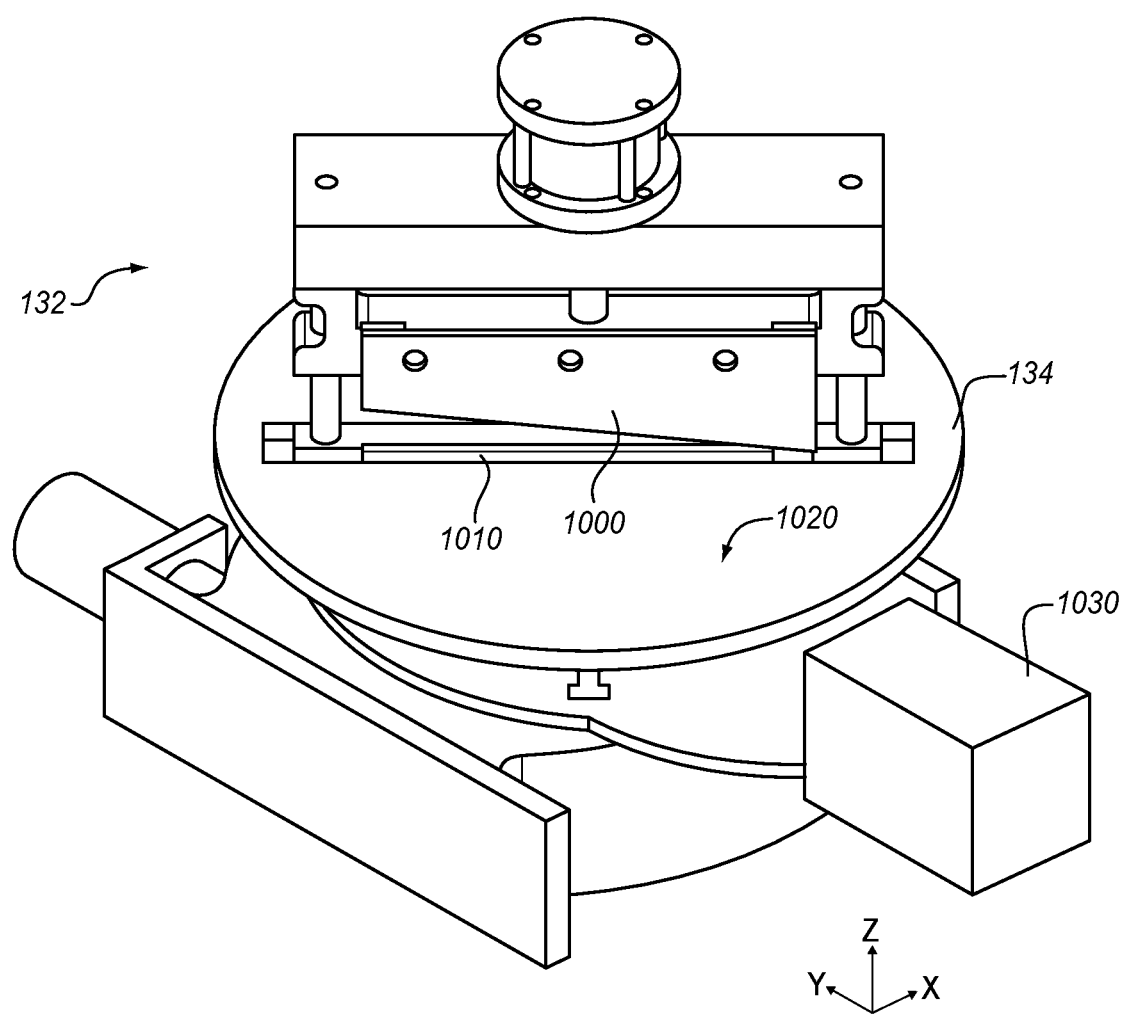
FIG. 10 is a perspective view diagram of a ply cutter for a lamination system in an exemplary embodiment.

Ply cutters 130 utilized by lamination system 100 may vary depending on embodiment. In one embodiment illustrated in FIG. 10, ply cutters 130 each comprise an angled blade 1000 which is mounted to reciprocate within a slot 1010 at a rotary table 134. In this manner, by adjusting an angle of rotary table 134, the angle of blade 1000 is adjusted. Surface 1020 of rotary table 134 may comprise a low-friction substance such as polyethylene. In one embodiment, ply cutter 130 is cooled by integrated cooler 1030 (e.g., a device that circulates refrigerant or a cold fluid) in order to ensure that blade 1000 does not stick to pieces 118 of fiber-reinforced material, or otherwise "gum up" during operation. In further embodiments, ply cutters 130 may comprise any suitable cutting devices, such as ultrasonic cutting blades mounted to actuators that move along X and Y, etc.

Figure 11:
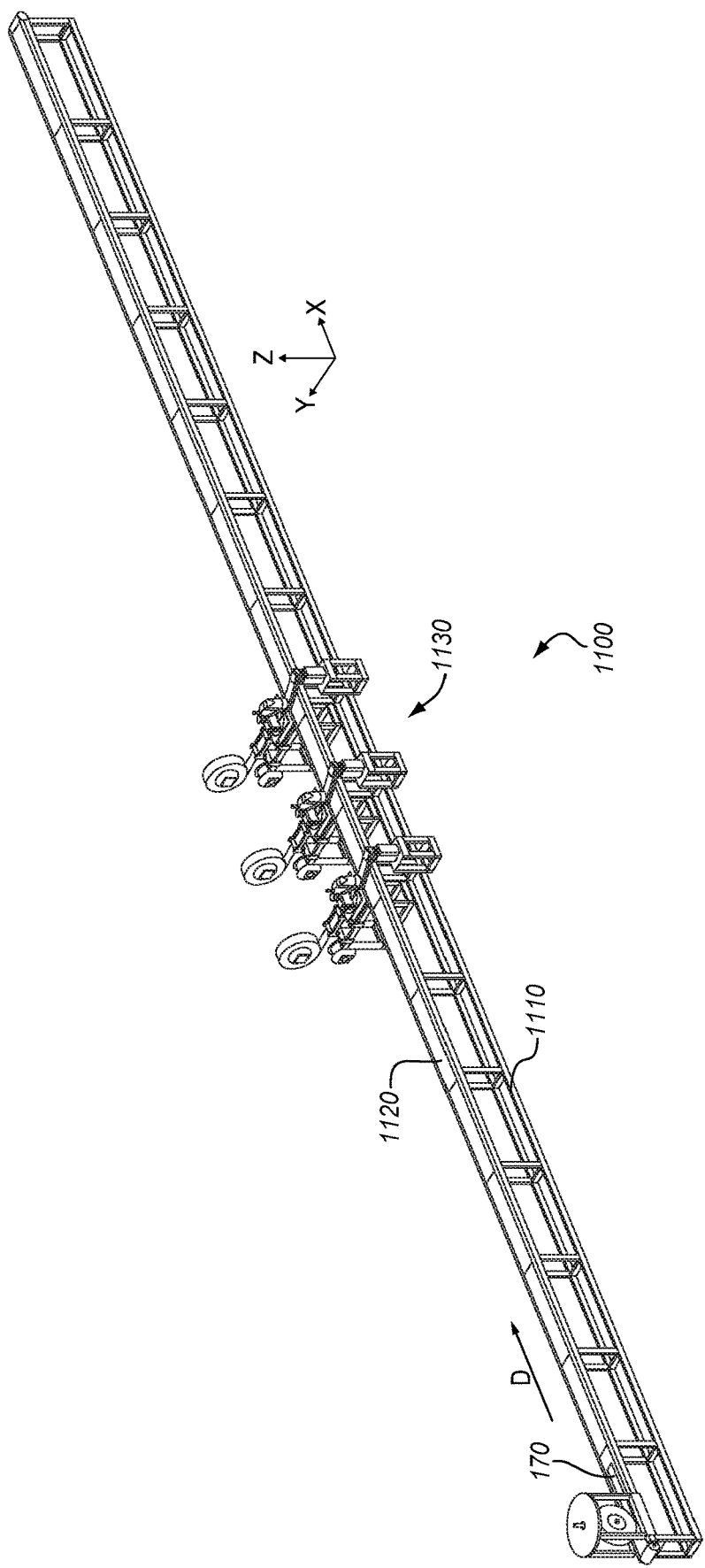
FIGS. 11-13 illustrate systems for moving lamination units relative to a surface in an exemplary embodiment.
Figure 12:
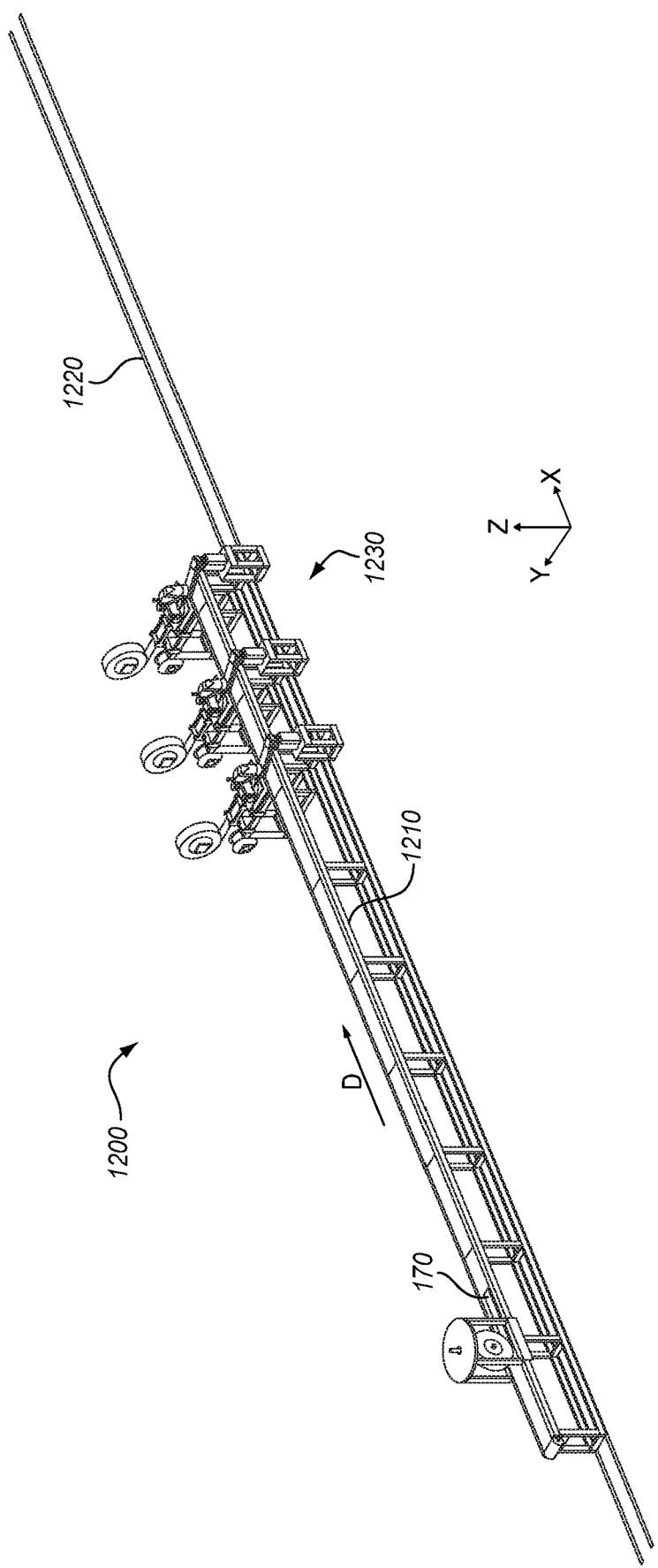
Figure 13:
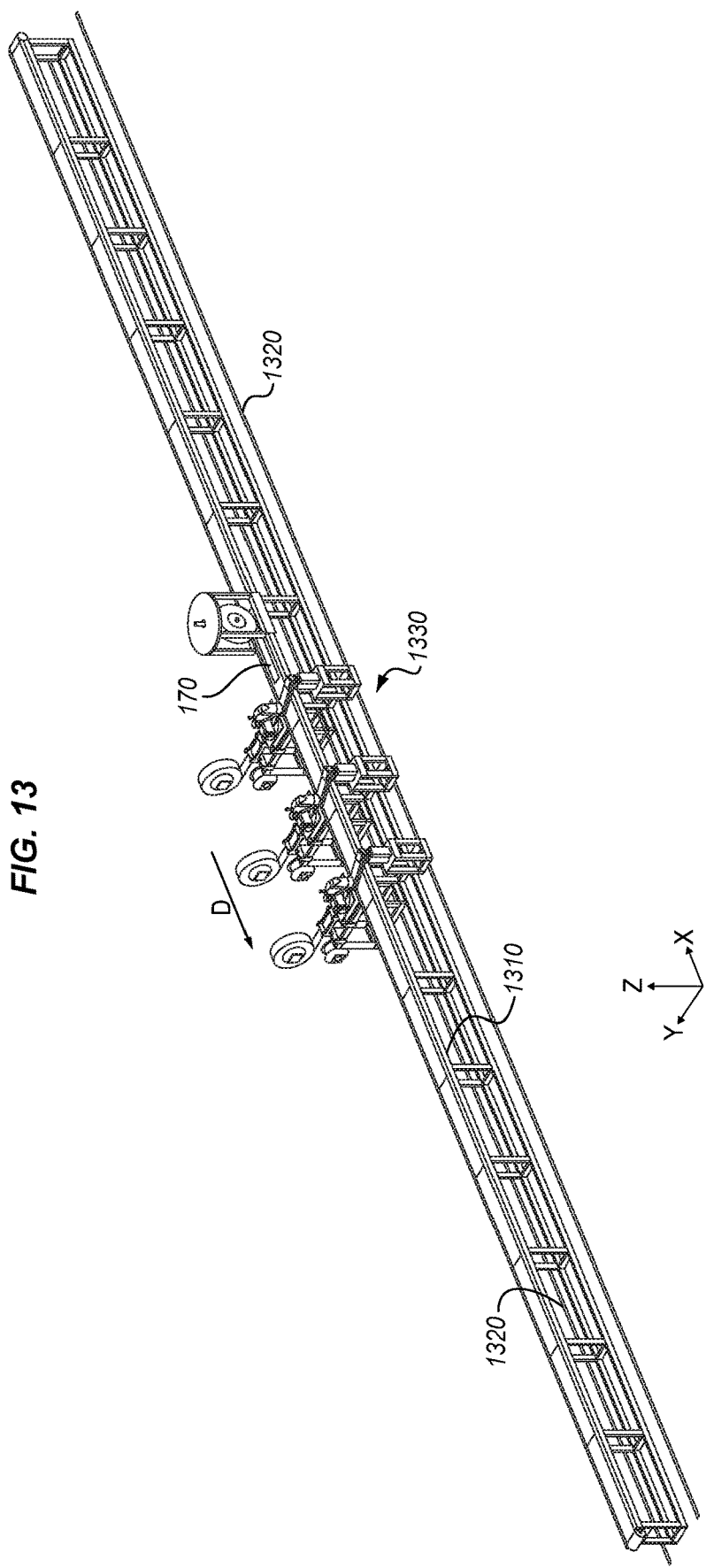

FIGS. 11-13 illustrate systems for moving lamination units relative to a platform in an exemplary embodiment. FIG. 11 illustrates lamination system 1100 similar to FIG. 1, wherein a rigid frame 1110 supports a conveyor belt (movement device) 1120 in order to advance a laminate past lamination unis 1130. Meanwhile, FIG. 12 illustrates a lamination system 1200 wherein laminate 170 is mounted to a mobile shuttle table (movement device) 1210 which moves along rails 1220 while advancing past lamination units. FIG. 13 illustrates a lamination system 1300 wherein lamination modules are affixed to a cart (movement device) 1330 which moves along track 1320 past a stationary frame 1310 upon which laminate 170 is laid-up.

EXAMPLES

In the following examples, additional processes, systems, and methods are described in the context of a lamination system 1400 that engages in rapid layup of a multi-layer, linear laminate of carbon-fiber reinforced material.

Figure 14:
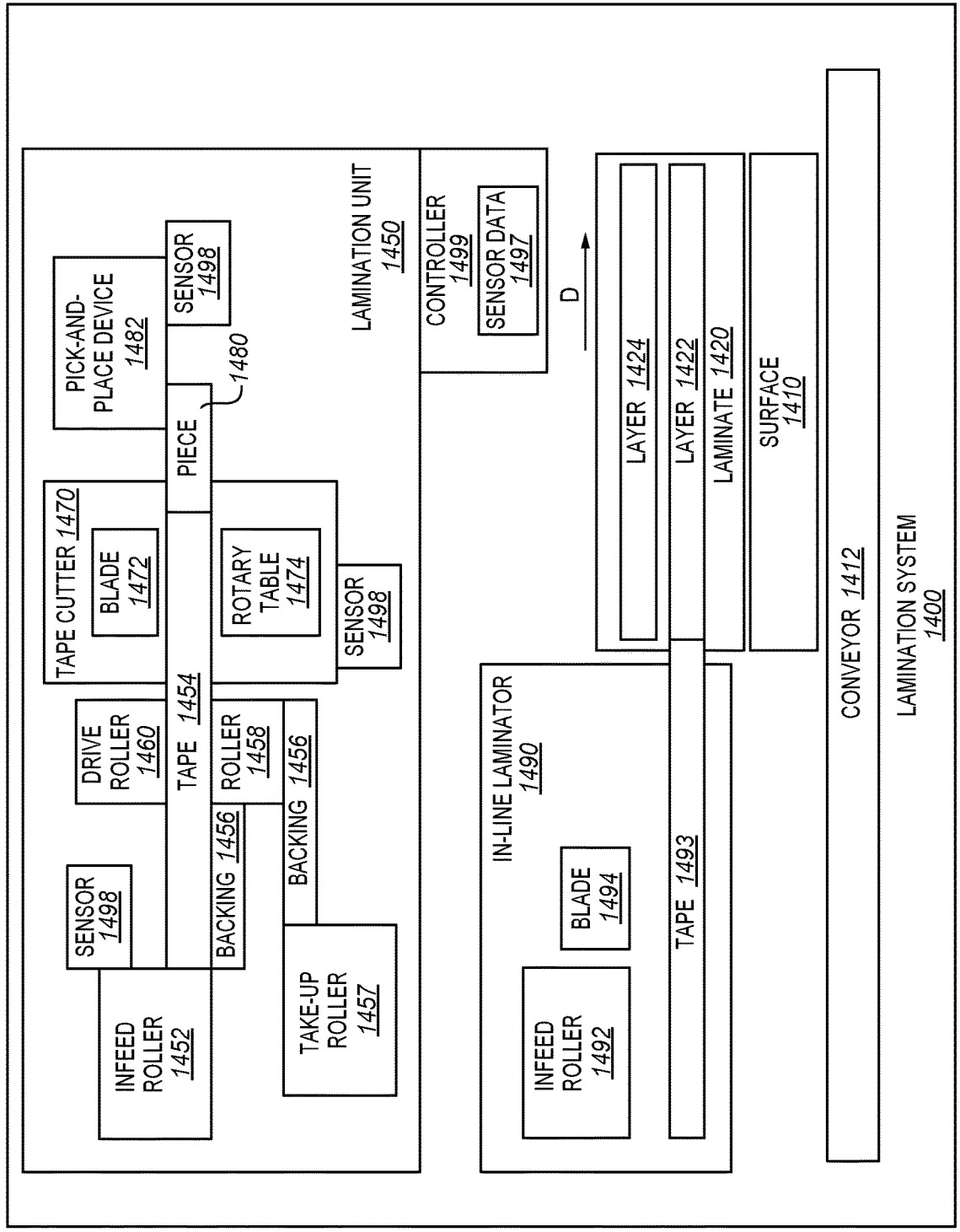
FIG. 14 is a block diagram of a lamination system in an exemplary embodiment.

FIG. 14 is a block diagram of lamination system 1400 in an exemplary embodiment. Lamination system 1400 includes surface 1410, which is moved in direction D by conveyor 1412 in order to advance laminate 1420. Lamination unit 1450 lays up pieces 1480 of material onto laminate 1420 in order to form layers 1422. In this embodiment, lamination unit 1450 includes infeed roller 1452, which supplies fiber-reinforced tape 1454 that is drawn by action of drive roller 1460. Backing 1456 is removed via roller 1458, which directs backing 1456 to take-up roller 1457. Tape cutter 1470 cuts tape 1454 at an adjustable angle via blade 1472, and rotary table 1474 may be rotated in order to adjust the angle. Pick-and-place device 1482 proceeds to pick up and place pieces 1480 onto layer 1424 of laminate 1420. In-line laminator 1490 is also shown, which lays up tape 1493 having a fiber orientation along D. Infeed roller 1492 supplies tape 1493, which is drawn by action of conveyor 1412. Blade 1494 cuts tape 1493 upon completion of layer 1422.

Sensors 1498 provide input for operating various components of lamination unit 1450. For example, one or more sensors 1498 may provide input for facilitating control of the infeed roller 1452 (e.g., via a tension sensor), input for tape cutter 1470 (e.g., via a pressure sensor that detects successful cuts, or a sensor that quantifies rotation of rotary table 1474), pairing of piece 1480 to pick and place device 1482 (e.g., via a pressure sensor), reporting location of piece 1480 on pick and place device 1482 (e.g., via a distancing sensor such as a laser sensor), sensing attachment of piece 1480 at pick and place device 1482 (e.g., via pressure sensor), locating pick and place device 1482 relative to a desired placement location at laminate 1420 (e.g., via a camera), providing location and/or orientation data when placing piece 1480, and reporting compaction force of piece 1480 onto laminate 1420 (e.g., via a pressure sensor). Controller 1499 may operate the various components of lamination unit 1450 based on sensor data 1497 from the various sensors 1498 described above to engage in feedback based control of the various lamination units.

Figure 15:
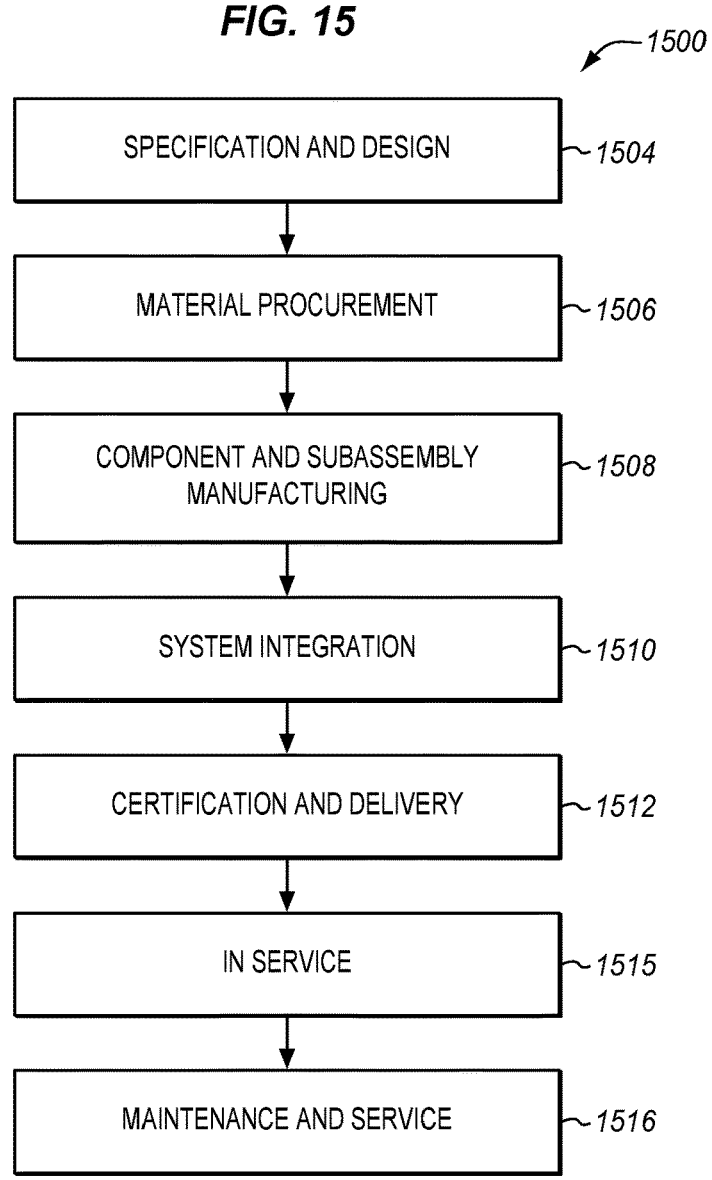
FIG. 15 is a flow diagram of aircraft production and service methodology in an exemplary embodiment.
Figure 16:
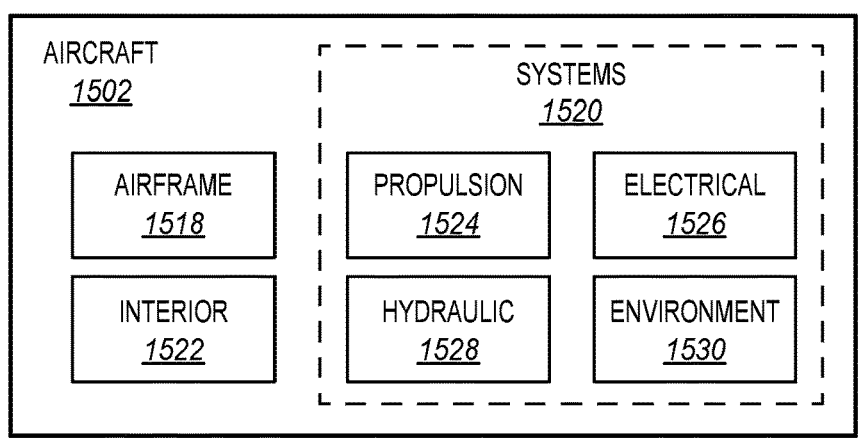
FIG. 16 is a block diagram of an aircraft in an exemplary embodiment.

Referring more particularly to the drawings, embodiments of the disclosure may be described in the context of an aircraft manufacturing and service method 1500 as shown in FIG. 15 and an aircraft 1502 as shown in FIG. 16. During pre-production, exemplary method 1500 may include specification and design 1504 of the aircraft 1502 and material procurement 1506. During production, component and subassembly manufacturing 1508 and system integration 1510 of the aircraft 1502 takes place. Thereafter, the aircraft 1502 may go through certification and delivery 1512 in order to be placed in service 1514. While in service by a customer, the aircraft 1502 is scheduled for routine maintenance and service 1516 (which may also include modification, reconfiguration, refurbishment, and so on). Apparatus and methods embodied herein may be employed during any one or more suitable stages of the production and service method 1500 (e.g., specification and design 1504, material procurement 1506, component and subassembly manufacturing 1508, system integration 1510, certification and delivery 1512, service 1514, maintenance and service 1516) and/or any suitable component of aircraft 1502 (e.g., airframe 1518, systems 1520, interior 1522, propulsion 1524, electrical 1526, hydraulic 1528, environmental 1530).

Each of the processes of method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 1502 produced by exemplary method 1500 may include an airframe 1518 with a plurality of systems 1520 and an interior 1522. Examples of high-level systems 1520 include one or more of a propulsion system 1524, an electrical system 1526, a hydraulic system 1528, and an environmental system 1530. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1500. For example, components or subassemblies corresponding to production stage 1508 may be fabricated or manufactured in a manner similar to components or subassemblies produced while the aircraft 1502 is in service. Also, one or more apparatus embodiments, method embodiments, or a combination thereof may be utilized during the production stages 1508 and 1510, for example, by substantially expediting assembly of or reducing the cost of an aircraft 1502. Similarly, one or more of apparatus embodiments, method embodiments, or a combination thereof may be utilized while the aircraft 1502 is in service, for example and without limitation, to maintenance and service 1516. For example, the techniques and systems described herein may be used for steps 1506, 1508, 1510, 1514, and/or 1516, and/or may be used for airframe 1518 and/or interior 1522. These techniques and systems may even be utilized for systems 1520, including for example propulsion 1524, electrical 1526, hydraulic 1528, and/or environmental 1530.

In one embodiment, a laminate 170 is cured to form composite part such as a portion of airframe 1518, and is manufactured during component and subassembly manufacturing 1508. The composite part may then be assembled into an aircraft in system integration 1510, and then be utilized in service 1514 until wear renders the composite part unusable. Then, in maintenance and service 1516, the laminate 170 may be discarded and replaced with a newly manufactured part. Inventive components and methods for laying up a laminate 170 may be utilized throughout component and subassembly manufacturing 1508 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
    laying up a multi-layer laminate of fiber reinforced material onto a surface, by:
        feeding a tape of fiber reinforced material to tape cutters which cut the tape into pieces;
        picking up pieces of the fiber reinforced material via pick-and-place devices at each of multiple lamination units that are in sequence in a direction of travel of the surface; and
        placing the pieces of fiber reinforced material via the pick-and-place devices to form a laminate as the surface changes position relative to the lamination units and multiple pieces are laid-up concurrently.

2. The method of claim 1 wherein:
    the lamination units include infeed rollers that store and supply the material.

3. The method of claim 1 further comprising:
    cutting tape of the material into pieces via tape cutters at the lamination units such that lamination units cut the tape at different angles.

4. The method of claim 1 further comprising:
    operating the lamination units concurrently as the surface changes position relative to the lamination units.

5. The method of claim 1 wherein:
    pieces cut by different lamination units are placed in different layers of the laminate.

6. The method of claim 1 further comprising:
    managing operations of the pick-and-place devices via a Numerical Control (NC) program.

7. The method of claim 1 wherein:
    placing the pieces comprises operating end effectors of the pick-and-place devices.

8. The method of claim 1 wherein:
    pieces cut by different lamination units are placed at different fiber orientations onto the laminate.

9. The method of claim 1 wherein:
one tape dispenser feeds the tape per pick and place device.

10. The method of claim 1 wherein:
the tape is fed to multiple pick and place devices from one tape dispenser.

11. The method of claim 1 wherein:
different pick and place devices lay up different layers of the laminate.

12. The method of claim 1 further comprising:
receiving input from a sensor indicating a position of a pick and place device relative to a piece; and
receiving input from a sensor indicating a position of a piece relative to the laminate.

13. The method of claim 1 further comprising
controlling the pick and place device to place a piece to form the laminate, based on input from at least one sensor.

14. A non-transitory computer readable medium embodying programmed instructions which, when executed by a processor, are operable for performing a method for laying up a laminate onto a surface, comprising:
feeding a tape of fiber reinforced material to tape cutters which cut the tape into pieces;
picking up pieces of the fiber reinforced material via pick-and-place devices at each of multiple lamination units that are in sequence in a direction of travel of the surface; and
placing the pieces of fiber reinforced material via the pick-and-place devices to form a laminate as the surface changes position relative to the lamination units and multiple pieces are laid-up concurrently.

15. An apparatus comprising:
a plurality of pick and place devices;
a controller;
sensors coupled to the controller;
a composite material supply device that supplies pieces of fiber reinforced material for the pick and place device; and
a movement device that alters a position of a surface being laid up, relative to the pick and place devices;
the controller controls operation of the pick and place devices based on input from the sensors.

16. The apparatus of claim 15 wherein:
the movement device comprises a shuttle table that moves past the pick and place devices.

17. The apparatus of claim 15 further comprising:
the movement device comprises a conveyor that conveys the laminate past the pick and place devices.

18. The apparatus of claim 15 wherein:
the surface is stationary; and
each of the pick and place devices is mounted to a cart that moves the pick and place device along the surface.

19. The apparatus of claim 15 further comprising:
an in-line laminator comprising:
an infeed roller that supplies a tape of the material having a fiber orientation parallel to the direction of travel;
a drive roller that draws tape from the infeed roller; and
a ply cutter that forms a full layer of the laminate by cutting a single piece of the tape.

20. The apparatus of claim 15 wherein:
the tape stored at an infeed roller for a pick and place device is attached to a backing,
the drive roller separates the tape from the backing, and
the apparatus further comprises:
a take-up reel that stores the backing that has been separated from the tape as the tape is drawn by the drive roller; and
a roller that directs the backing from the tape to the take-up reel.

21. A system comprising:
a surface; and
lamination units that change position with respect to the surface as the surface moves, that are arranged in sequence along a direction of travel, and that each lay up pieces of a multi-layer laminate of fiber reinforced material onto the surface, each lamination unit comprising:
a ply cutter that cuts pieces from a tape of the material at an angle and is rotatable to change the angle during operation; and
a pick-and-place device that lays up a layer of the laminate by picking up the pieces and placing the pieces onto the laminate.

22. The system of claim 21 wherein:
the lamination units comprise:
a first lamination unit that places pieces for a first layer at a first fiber orientation; and
a second lamination unit, downstream of the first lamination unit, that places pieces for a second layer at a second fiber orientation.

23. The system of claim 21 wherein:
the surface is part of a shuttle table that moves past the lamination units.

24. The system of claim 21 wherein:
the surface is part of a conveyor that conveys the laminate past the lamination units.

25. The system of claim 21 wherein:
the surface is stationary; and
each of the lamination units is mounted to a cart that moves the lamination unit along the surface.

26. The system of claim 21 further comprising:
an in-line laminator comprising:
an infeed roller that supplies a tape of the material having a fiber orientation parallel to the direction of travel;
a drive roller that draws tape from the infeed roller; and
a ply cutter that forms a full layer of the laminate by cutting a single piece of the tape.

27. The system of claim 21 wherein:
the tape stored at infeed rollers of the lamination units is attached to a backing,
the drive roller separates the tape from the backing, and
each lamination unit further comprises:
a take-up reel that stores the backing that has been separated from the tape as the tape is drawn by the drive roller; and
a roller that directs the backing from the tape to the take-up reel.

28. The system of claim 21 wherein:
each lamination unit lays up a different layer of the laminate.

29. The system of claim 21 further comprising:
a controller that, for each lamination unit:
determines the angle of the ply cutter, and directs the pick-and-place device to arrange the pieces onto the laminate in a contiguous layer at a fiber orientation corresponding to the angle.

30. The system of claim 29 wherein:
the controller directs a ply cutter to change the angle during operation to form an end piece having ends at different angles.

31. The system of claim 21 wherein:
the ply cutters cut the pieces from the tape at different angles with respect to each other.

32. The system of claim 21 wherein:
each ply cutter comprises a blade mounted to a rotary table.

33. The system of claim 32 wherein:
the rotary table includes a polyethylene surface.

34. The system of claim 21 wherein:
the ply cutter comprises a cooler that reduces a temperature of the tape prior to cutting.

35. The medium of claim 14 wherein:
the lamination units include infeed rollers that store and supply the material.

36. The medium of claim 14 wherein the method further comprises:
cutting tape of the material into pieces via tape cutters at the lamination units such that lamination units cut the tape at different angles.

37. The medium of claim 14 wherein the method further comprises:
operating the lamination units concurrently as the surface changes position relative to the lamination units.

38. The medium of claim 14 wherein:
pieces cut by different lamination units are placed in different layers of the laminate.

39. The medium of claim 14 wherein the method further comprises:
managing operations of the pick-and-place devices via a Numerical Control (NC) program.

40. The medium of claim 14 wherein:
placing the pieces comprises operating end effectors of the pick-and-place devices.

* * * * *